United States Patent [19]
Takeuchi

[11] Patent Number: 5,689,436
[45] Date of Patent: Nov. 18, 1997

[54] APPARATUS FOR COMPRESSING AND DECOMPRESSING VIDEO SIGNAL

[75] Inventor: Kesatoshi Takeuchi, Suwa, Japan

[73] Assignee: Seiko Epson Corporation, Tokyo, Japan

[21] Appl. No.: 496,676

[22] Filed: Jun. 29, 1995

[30] Foreign Application Priority Data

Jul. 20, 1994 [JP] Japan .................................. 6-190986

[51] Int. Cl.$^6$ .................................................. G06K 15/00
[52] U.S. Cl. .................................................. 364/514 A
[58] Field of Search ........................... 348/384, 390; 382/232, 233, 236, 238; 364/514 R, 715.02

[56] References Cited

U.S. PATENT DOCUMENTS

| | | | |
|---|---|---|---|
| 5,341,440 | 8/1994 | Earl et al. | 382/56 |
| 5,463,419 | 10/1995 | Saito | 348/233 |
| 5,481,307 | 1/1996 | Goldstein et al. | 348/232 |
| 5,485,279 | 1/1996 | Yonemitsu et al. | 348/411 |
| 5,497,434 | 3/1996 | Wilson | 382/232 |
| 5,553,164 | 9/1996 | Itagaki | 382/232 |

FOREIGN PATENT DOCUMENTS 4-307876  10/1992  Japan .

*Primary Examiner*—Douglas W. Olms
*Assistant Examiner*—A. Bnimoussa
*Attorney, Agent, or Firm*—Oblon, Spivak, McClelland, Maier & Neustadt, P.C.

[57] ABSTRACT

While a image is displayed on a color monitor 44 based on a first digital video signal DRGB1 output from a first A-D converter 52, a second digital video signal DRGB2 output from a second A-D converter 54 is compressed to capture the image. The image represented by the compressed video data has a smaller size than the original image. In restoration of the image, a video decompressing unit 66 enlarges the size of the image and displays an enlarged image on the color monitor 44.

14 Claims, 16 Drawing Sheets

Fig. 2(A) INITIAL SCREEN DISPLAY
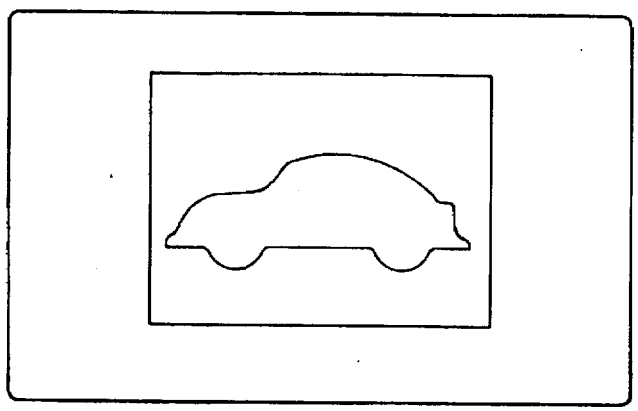
Fig. 2(B) SCREEN DISPLAY IN CAPTURING/RESTORATION
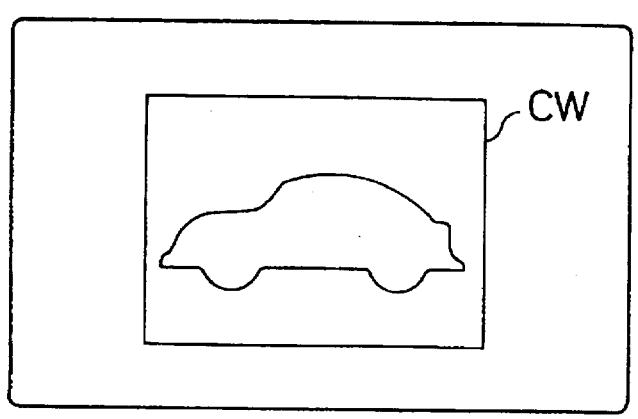
Fig. 2(C) COMPRESSED VIDEO DATA
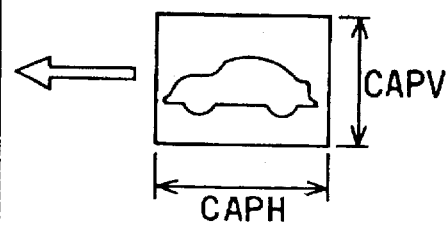

Fig. 12 (A) VIDEO DATA IN WORKING MEMORY 100

Fig. 12 (B) EXPANDED VIDEO DATA

HORIZONTAL MAGNIFICATION: $MH2 = \dfrac{fDCK}{fDCKX}$

VERTICAL MAGNIFICATION: $MV2 = \dfrac{fHSYNC}{fLINCX}$

Fig. 17(A) INITIAL SCREEN DISPLAY
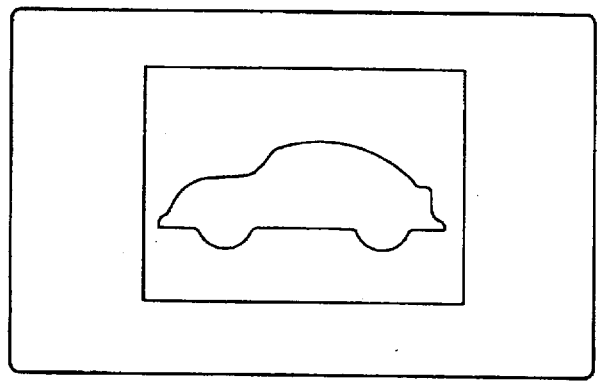
Fig. 17(B) SCREEN DISPLAY IN DATA
CAPTURE OR IMAGE RESTORATION
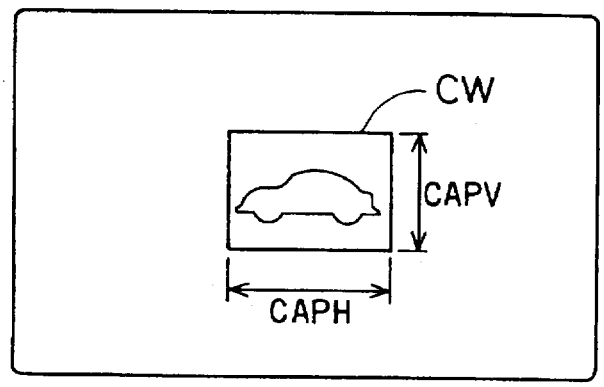
Fig. 17(C) COMPRESSED
VIDEO DATA
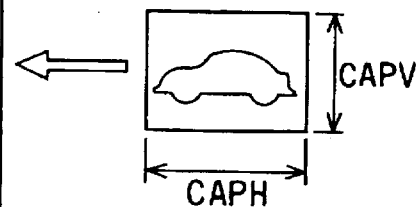

APPARATUS FOR COMPRESSING AND DECOMPRESSING VIDEO SIGNAL

BACKGROUND OF THE INVENTION

1. Field of the Invention

The present invention relates to an apparatus for compressing and decompressing a video signal representing a moving picture.

2. Description of the Related Art

Some recent personal computers have a function of capturing a moving picture to produce compressed video data while displaying the moving picture in its original size on a monitor. FIGS. 17(A) through 17(C) show the capturing of a moving picture in the conventional computer systems. A relatively large moving picture is displayed before the capturing is executed as shown in FIG. 17(A), and a small capture window CW is displayed in the screen during the capturing as shown in FIG. 17(B). The conventional systems usually compress video data representing a moving picture having a size (CAPH×CAPV) of the capture window CW as shown in FIG. 17(C).

The speed of compression depends upon a number of dots CAPH in the horizontal direction of the video image to be captured and upon a number of lines CAPV in the vertical direction. Accordingly, in capturing of a moving picture, the video image size (CAPH×CAPV) is set to a small value to allow high-speed compression of video data in the conventional computer systems. A preferable size is, for example, CAPH=160 dots and CAPV=120 lines to attain smooth capturing although a general video image has a size of 640 dots×480 lines or larger. In other words, the size suitable for the high-speed capturing, for example, 160 dots×120 lines, is significantly smaller than the size of the usual video image such as 640 dots×480 lines.

In restoration of a captured moving picture, a video image displayed on the monitor has the size (CAPH×CAPV), which is defined for the data capturing. In other words, a small moving picture corresponding to the size of the capture window CW is only displayed both in the capturing and the restoration of a moving picture.

SUMMARY OF THE INVENTION

Accordingly, an object of the invention is to compress video data of a picture into a relatively small data volume while displaying a picture in a relatively large size.

The present invention is directed to an apparatus for compressing a video signal. The apparatus includes a display device for displaying a video image; a frame memory for storing a video signal to be supplied to the display device; receiving means for receiving a video signal representing an image; a video controller for writing the video signal supplied from the receiving means into the frame memory and reading out the video signal from the frame memory to display the image on the display device as a function of the video signal; reducing-compressing means for processing the video signal supplied from the receiving means to reduce a size of the image and compressing a video signal representing the reduced image to generate a compressed video signal; and a memory for storing the compressed video signal.

Accordingly, the reducing-compressing means produces a compressed video data representing a reduced image while the video controller displays the image of non-reduced size.

In a preferred embodiment, the apparatus further comprises: a first A-D converter, coupled between the receiving means and the video controller, for executing analog-to-digital conversion on the video signal in synchronism with a first clock signal to thereby produce a first digital video signal and transmitting the first digital video signal to the video controller; and a second A-D converter, coupled between the receiving means and the reducing-compressing means, for executing analog-to-digital conversion on the video signal in synchronism with a second clock signal to thereby produce a second digital video signal and transmitting the second digital video signal to the reducing-compressing means; and wherein said reducing-compressing means comprises: horizontal reducing means for supplying the second clock signal to the second A-D converter and adjusting a frequency of the second clock signal to reduce an image represented by the second digital video signal in a horizontal direction; compressing means for compressing the second digital video signal; and vertical reducing means for supplying a scanning line timing signal to the compressing means, the scanning line timing signal indicating a timing of updating a vertical address of the second digital video signal, and adjusting a frequency of the scanning line timing signal to reduce the image in the vertical direction.

Accordingly, a video image is reduced arbitrarily in the horizontal direction through conversion by the second A-D converter controlled by the horizontal reducing means, and reduced in the vertical direction by the vertical reducing means.

The present invention is further directed to an apparatus for decompressing a compressed video signal. The apparatus comprises: a display device for displaying a video image; a frame memory for storing a video signal to be supplied to the display device; a memory for storing a compressed video signal; decompressing-enlarging means for decompressing the compressed video signal stored in the memory to generate a restored video signal, and processing the restored video signal to enlarge a size of an image represented by the restored video signal; and a video controller for writing the restored video signal supplied from the decompressing-enlarging means into the frame memory and reading out the restored video signal from the frame memory to display the image on the display device as a function of the restored video signal.

Accordingly, the decompressing-enlarging means produces a restored video signal representing an enlarged image, and the video controller displays the enlarged image. Therefore, a relatively large image is displayed from compressed video data representing an image of a relatively small size.

In a preferred embodiment, the decompressing-enlarging means comprises: decompressing means for decompressing the compressed video signal to generate the restored video signal; a working memory for storing the restored video signal; vertical address generating means for generating a vertical address representing a scanning line position, the vertical address being to be supplied to the working memory in reading of the restored video signal from the working memory; horizontal address generating means for generating a horizontal address representing a pixel position on each scanning line, the horizontal address being supplied to the working memory in reading of the restored video signal from the working memory; vertical enlarging means for supplying a line increment signal to the vertical address generating means, the line increment signal indicating a timing of updating the vertical address, and adjusting a frequency of the line increment signal to enlarge the image in the vertical direction; and horizontal enlarging means for supplying a dot clock signal to the horizontal address generating means, the dot clock signal indicating a timing of updating the horizontal address, and adjusting a frequency of the dot clock signal to enlarge the image in the horizontal direction.

Accordingly, an image is enlarged in the vertical direction by the vertical address generating means and the vertical enlarging means, and enlarged in the horizontal direction by the horizontal address generating means and the horizontal enlarging means.

The present invention is also directed to an apparatus for compressing a video signal and decompressing a compressed video signal. The apparatus comprising: a display device for displaying a video image; a frame memory for storing a video signal to be supplied to the display device; a video controller for writing a given video signal into the frame memory and reading out a video signal from the frame memory to display a video image on the display device as a function of the read-out video signal; receiving means for receiving a video signal representing an image and supplying the video signal to the video controller, to thereby display the image on the display device as a function of the video signal; reducing-compressing means for processing the video signal supplied from the receiving means to reduce a size of the image and compressing a video signal representing the reduced image to generate a compressed video signal; a memory for storing the compressed video signal; and decompressing-enlarging means for decompressing the compressed video signal stored in the memory to generate a restored video signal, processing the restored video signal to enlarge a size of an image represented by the restored video signal, and supplying the restored video signal representing the enlarged image to the video controller, to thereby display the enlarged image on the display device as a function of the restored video signal.

The present invention is further directed to a computer system for compressing a video signal representing a moving picture. The computer system comprises: a microprocessor; a processor bus coupled to the microprocessor; a display device for displaying a video image; a frame memory for storing a video signal to be supplied to the display device; receiving means for receiving a video signal representing an image; a video controller, coupled to the processor bus, the frame memory, and the display device, for writing the video signal supplied from the receiving means into the frame memory and reading out the video signal from the frame memory to display the image on the display device as a function of the video signal; reducing-compressing means, coupled to the processor bus, for processing the video signal supplied from the receiving means to reduce a size of the image and compressing a video signal representing the reduced image to generate a compressed video signal; and a memory for storing the compressed video signal.

In another aspect of the present invention, a computer system comprises: a microprocessor; a processor bus coupled to the microprocessor; a display device for displaying a video image; a frame memory for storing a video signal to be supplied to the display device; a memory, coupled to the processor bus, for storing a compressed video signal; decompressing-enlarging means, coupled to the processor bus, for decompressing the compressed video signal stored in the memory to generate a restored video signal, and processing the restored video signal to enlarge a size of an image represented by the restored video signal; and a video controller, coupled to the processor bus and the frame memory, for writing the restored video signal supplied from the decompressing-enlarging means into the frame memory and reading out the video signal from the frame memory to display the image on the display device as a function of the video signal.

In still another aspect of the present invention, a computer system for compressing a video signal and decompressing a compressed video signal, the computer system comprising: a microprocessor; a processor bus coupled to the microprocessor; a display device for displaying a video image; a frame memory for storing a video signal to be supplied to the display device; a video controller, coupled to the processor bus, the display device, and the frame memory, for writing a given video signal into the frame memory and reading out a video signal from the frame memory to display a video image on the display device as a function of the read-out video signal; receiving means for receiving a video signal representing an image and supplying the video signal to the video controller, to thereby display the image on the display device as a function of the video signal; reducing-compressing means, coupled to the processor bus, for processing the video signal supplied from the receiving means to reduce a size of the image and compressing a video signal representing the reduced image to generate a compressed video signal; a memory, coupled to the processor bus, for storing the compressed video signal; and decompressing-enlarging means, coupled to the processor bus, for decompressing the compressed video signal stored in the memory to generate a restored video signal, processing the restored video signal to enlarge a size of an image represented by the restored video signal, and supplying the restored video signal representing the enlarged image to the video controller, to thereby display the enlarged image on the display device as a function of the restored video signal.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A) through 2(C) show capture and restoration of video images by the compressing/decompressing unit 60;

FIGS. 17(A) through 17(C) show the capturing of a moving picture in a conventional system.

DESCRIPTION OF THE PREFERRED EMBODIMENT

A. General Structure of Apparatus

Figure 1:
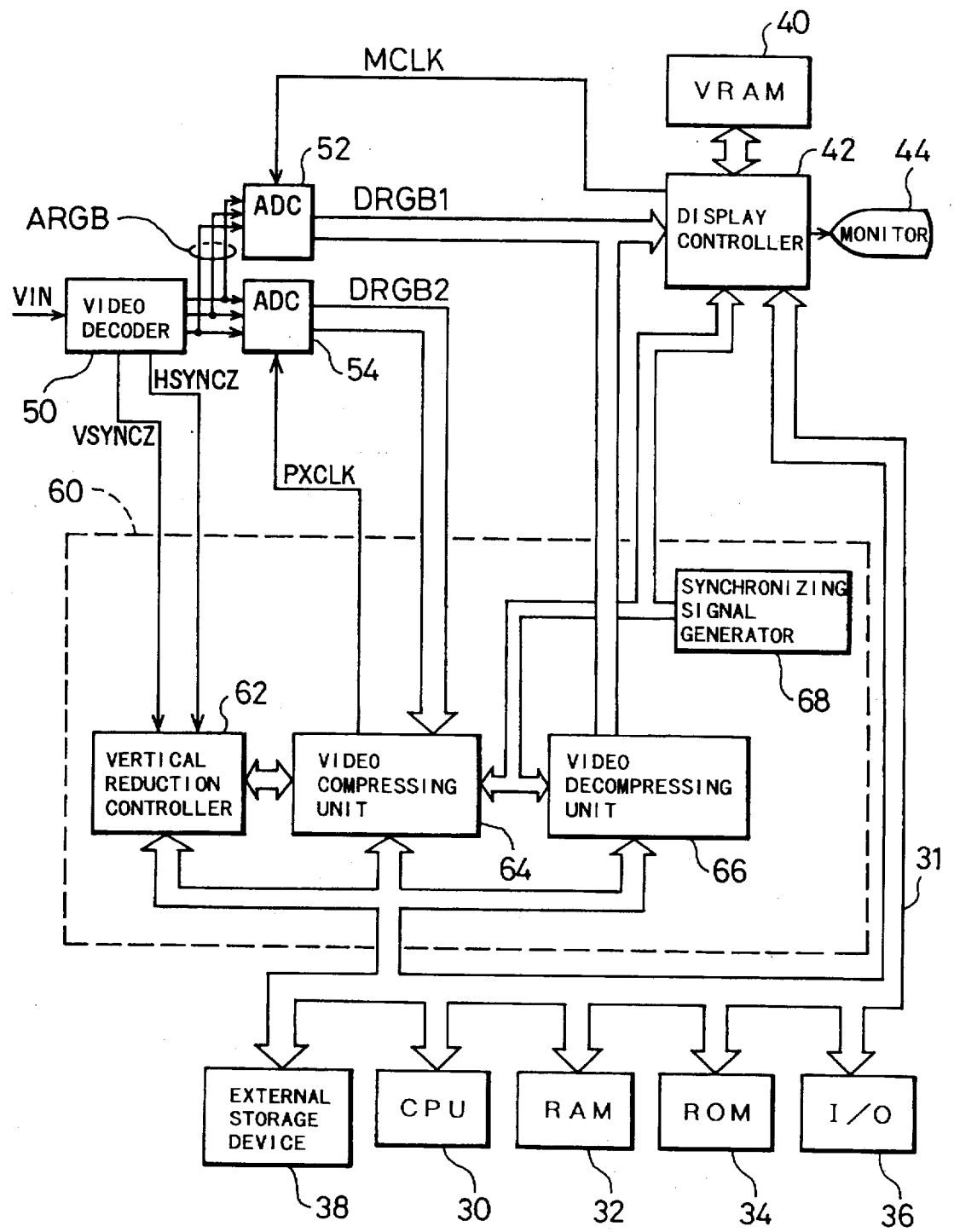
FIG. 1 is a block diagram illustrating the structure of a computer system including a compressing/decompressing unit embodying the invention.

FIG. 1 is a block diagram illustrating the structure of a computer system including a compressing/decompressing apparatus embodying the invention. The computer system comprises a CPU 30, a RAM 32 and a ROM 34 working as main memories, an extension interface 36, an external storage device 38, a video RAM (VRAM) 40 working as a frame memory, a display controller 42, a color monitor 44 working as a display device, a video decoder 50 for decoding composite video signals supplied from an external device, two A-D converters 52 and 54, and a compressing/decompressing unit 60.

The compressing/decompressing unit 60 comprises a the vertical reduction controller 62, a video compressing unit 64, a video decompressing unit 66, and a synchronizing signal generator 68. The vertical reduction controller 62 has a function of reducing a size of a video image in the vertical direction while compressing video data representing a moving picture. Reduction in the horizontal direction is implemented by the video compressing unit 64 and the A-D converter 54 as described later in detail. The video decompressing unit 66 has a function of decompressing compressed video data and enlarging a video image both in the vertical direction and the horizontal direction.

The video decoder 50 decodes a composite video signal VIN supplied from an external device such as a TV tuner to generate a vertical synchronizing signal VSYNCZ, a horizontal synchronizing signal HSYNCZ, and a component video signal ARGB. The component video signal ARGB consists of three analog video signals representing luminance of respective primary colors of R, G, and B. The two synchronizing signals VSYNCZ and HSYNCZ are supplied to the vertical reduction controller 62 while the component video signal ARGB is transmitted commonly to the first and second A-D converters 52 and 54.

The first A-D converter 52 converts the component video signal ARGB to a first digital video signal DRGB1, which is subsequently transmitted to the display controller 42. The display controller 42 writes the digital video signal DRGB1 into the VRAM 40 whereas reading out a video signal previously stored in the VRAM 40 and transmitting the read-out video signal to the color monitor 44 to display an image accordingly. The second A-D converter 54, on the other hand, converts the component video signal ARGB to a second digital video signal DRGB2, which is subsequently given to the video compressing unit 64. A clock signal MCLK output from the display controller 42 defines a conversion timing in the first A-D converter 52, while another clock signal PXCLK output from the video compressing unit 64 defines a conversion timing in the second A-D converter 54.

In capturing of a moving picture, a video image is displayed on the color monitor 44 on the basis of the first digital video signal DRGB1 whereas the second digital video signal DRGB2 is compressed by the video compressing unit 64 to produce compressed video data. The compressed video data is stored in the external storage device 38, such as a magnetic disk or an magnet-optical disk. In restoration of the compressed moving picture, the compressed video data read out of the external storage device 38 is decompressed by the video decompressing unit 66, and the digital video signal thus obtained is supplied to the display controller 42 to display a video image on the color monitor 44 accordingly.

FIGS. 2(A) through 2(C) show capturing and restoration of an image by the compressing/decompressing unit 60. In capturing of a moving picture, a capture window CW shown in FIG. 2(B) is maintained to have an original size of the image shown in FIG. 2(A), irrespective of a size of the moving picture to be captured, that is, (CAPH×CAPV) shown in FIG. 2(C). In restoration of the moving picture, a restored moving picture of the original size is also displayed on the monitor irrespective of the size of the moving picture represented by the compressed video data. An image-expansion rate in the image restoration can be set different from an image-reduction rate in the image capturing. This allows a restored moving picture to be displayed at a desired size regardless of its original size.

B. Video Compressing Process in Image Capturing

Figure 3:
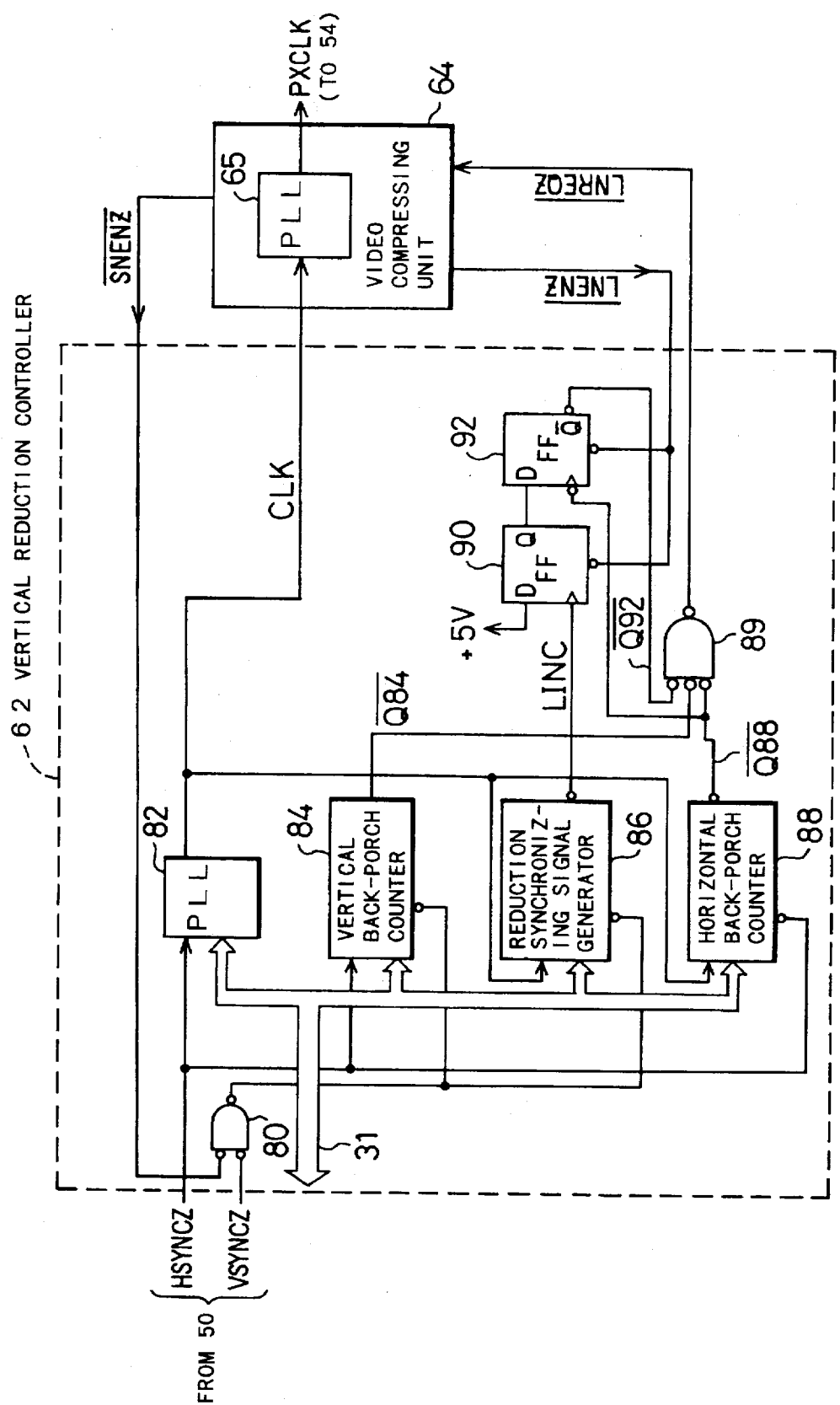
FIG. 3 is a block diagram showing the internal structure of a the vertical reduction controller 62 and a video compressing unit 64.

FIG. 3 is a block diagram showing the internal structure of the vertical reduction controller 62 and the video compressing unit 64. The vertical reduction controller 62 includes an OR gate 80, a PLL circuit 82, a vertical back-porch counter 84, a reduction synchronizing signal generator 86, a horizontal back-porch counter 88, a 3-input OR gate 89, and two D-type flip-flops (FF) 90 and 92. The video compressing unit 64 comprises a PLL circuit 65.

The PLL circuit 82 receives the horizontal synchronizing signal HSYNCZ transmitted from the video decoder 50 (FIG. 1) and generates a reference clock signal CLK from the horizontal synchronizing signal HSYNCZ. The reference clock signal CLK represents an update timing of each pixel for the composite video signal VIN (FIG. 1). The PLL circuit 65 receives the reference clock signal CLK to generate a pixel clock PXCLK, which defines an update timing of each pixel in compression of a video image. As illustrated in FIG. 1, the second A-D converter 54 converts the analog video signal ARGB to the second digital video signal DRGB2 synchronously with the pixel clock PXCLK.

The video compressing unit 64 produces a scan enable signal /SNENZ, which falls to logic low in response to an instruction given from the CPU 30 (FIG. 1) to start the compressing operations. In the specification, the symbol '/' attached before a signal name represents that the signal is active when logic low. The scan enable signal /SNENZ is input into the OR gate 80 together with the vertical synchronizing signal VSYNCZ. When the vertical synchronizing signal VSYNCZ becomes logic low after a fall of the scan enable signal /SNENZ to logic low, the output of the OR gate 80 falls to logic low accordingly.

The output of the OR gate 80 is given to reset input terminals of the vertical back-porch counter 84 and the reduction synchronizing signal generator 86. A clock input terminal of the vertical back-porch counter 84 receives the horizontal synchronizing signal HSYNCZ. The vertical back-porch counter 84 is reset in response to the L-level output of the OR gate 80 and starts counting up the number of pulses of the horizontal synchronizing signal HSYNCZ.

When the count reaches a fixed number previously set by the CPU 30, an output signal /Q84 from the vertical back-porch counter 84 falls to logic low. The scan enable signal /SNENZ output from the video compressing unit 64 to the OR gate 80 is kept in logic low during compression of a video image. The vertical back-porch counter 84 accordingly measures a vertical back-porch period every time when a pulse of the vertical synchronizing signal VSYNCZ is supplied to the vertical reduction controller 62, that is, a vertical back-porch period for every field. After the elapse of each vertical back-porch period, the output /Q84 of the vertical back-porch counter 84 falls to logic low.

The horizontal back-porch counter 88 receives the reference clock signal CLK at its clock input terminal and the horizontal synchronizing signal HSYNCZ at its reset terminal. The horizontal back-porch counter 88 is reset in response to a fall of the horizontal synchronizing signal HSYNCZ to logic low and starts counting up the number of pulses of the reference clock signal CLK. When the count reaches a fixed number previously set by the CPU 30, an output signal /Q88 from the horizontal back-porch counter 88 falls to logic low. The horizontal back-porch counter 88 accordingly measures a horizontal back-porch period every time when a pulse of the horizontal synchronizing signal HSYNCZ is supplied to the vertical reduction controller 62, that is, a horizontal back-porch period for every scanning line. After the elapse of each horizontal back-porch period, the output /Q88 of the horizontal back-porch counter 88 falls to logic low.

The reduction synchronizing signal generator 86 counts up the number of pulses of the reference clock signal CLK transmitted from the PLL circuit 82, and generates a pulse of line increment signal LINC every time when the count reaches a number which is previously set by the CPU 30. The line increment signal LINC determines a timing of increasing a vertical address of a video image and has a function of defining a reduction rate of a video image in the vertical direction as described later in detail.

The first flip-flop 90 has a clock input terminal for receiving the line increment signal LINC and a pulled-up D-input terminal. An output of the first flip-flop 90 is given to a D-input terminal of the second flip-flop 92. An inversion of the output /Q88 of the horizontal back-porch counter 88 is input into a clock input terminal of the second flip-flop 92. The 3-input OR gate 89 receives an inverted output /Q92 of the second flip-flop 92 as well as the output /Q84 of the vertical back-porch counter 84 and the output /Q88 of the horizontal back-porch counter 88.

An output of the 3-input OR gate 89 is given to the video compressing unit 64 as a line request signal /LNREQZ which instructs a start of compression of one scanning line. The line request signal /LNREQZ corresponds to the scanning line timing signal of the claimed invention. The video compressing unit 64 receives the line request signal /LNREQZ and outputs a line enable signal /LNENZ permitting compression of video data accordingly. The two flip-flops 90 and 92 are reset by the line enable signal /LNENZ.

Figure 4:
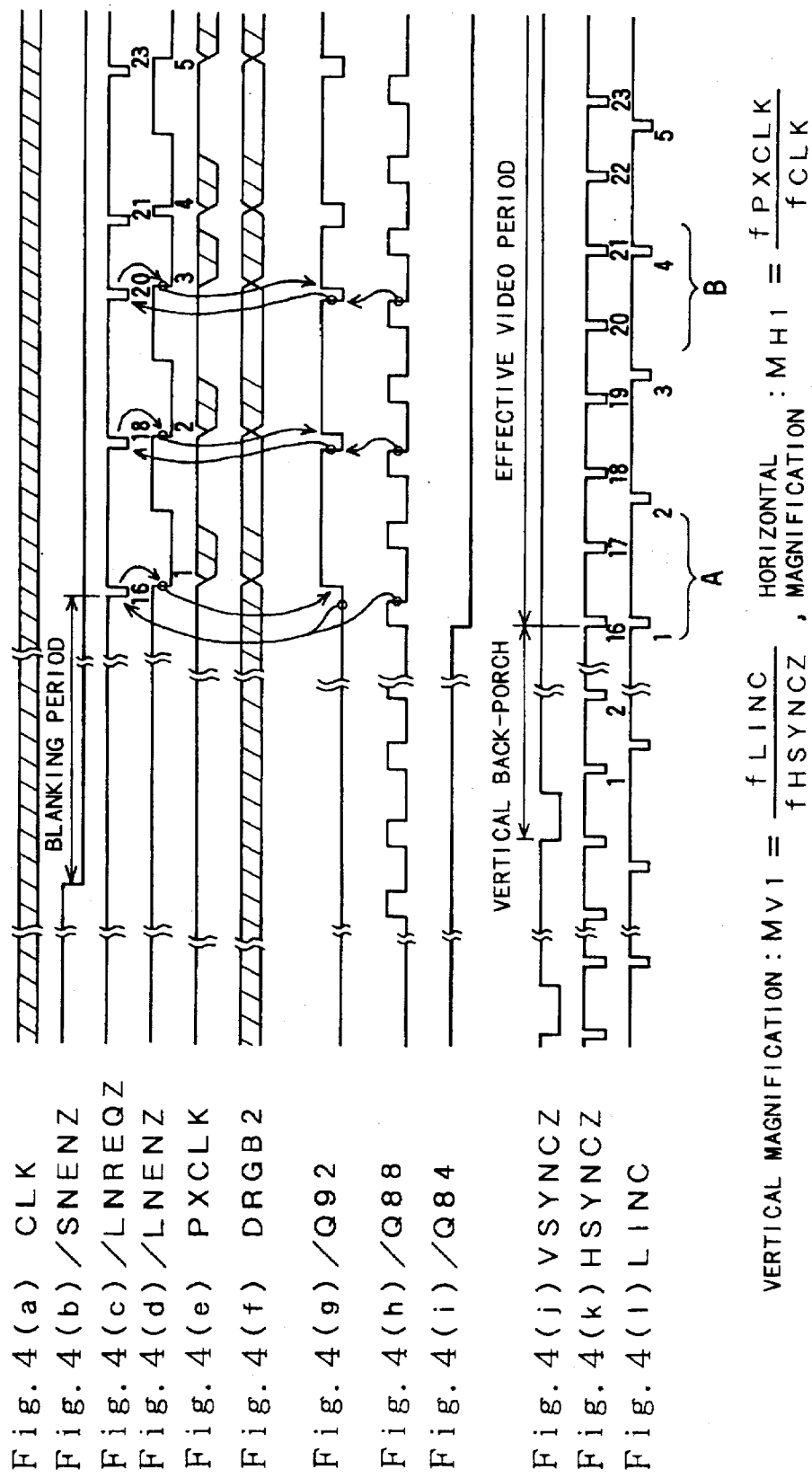
FIGS. 4(a) through 4(l) are timing charts showing image reduction and compression operations.

FIGS. 4(a) through 4(l) are timing charts showing image reduction and compression operations. The video compressing unit 64 makes the scan enable signal /SNENZ fall to logic low (FIG. 4(b)) in response to an instruction given from the CPU 30 to start the capture operation. The vertical back-porch counter 84 receives one pulse of the vertical synchronizing signal VSYNCZ (FIG. 4(j)) and starts counting up the number of pulses of the horizontal synchronizing signal HSYNCZ (FIG. 4(k)). When the count reaches a preset number (=16) corresponding to a vertical back-porch period, the output /Q84 of the vertical back-porch counter 84 falls to logic low (FIG. 4(i)). An effective video period follows the vertical back-porch period as shown in FIG. 4(j).

FIGS. 5(a) through 5(l) are timing charts showing details of a specific period immediately after the vertical back-porch period in the timing chart of FIGS. 4(a) through 4(l) (part A shown in FIG. 4(l)). The horizontal back-porch counter 88 makes its output /Q88 rise to logic high in response to a falling edge of the horizontal synchronizing signal HSYNCZ and starts counting up the number of pulses of the reference clock signal CLK. When the count reaches a preset number corresponding to a horizontal back-porch period, the output /Q88 of the horizontal back-porch counter 88 falls to logic low.

Figure 5:
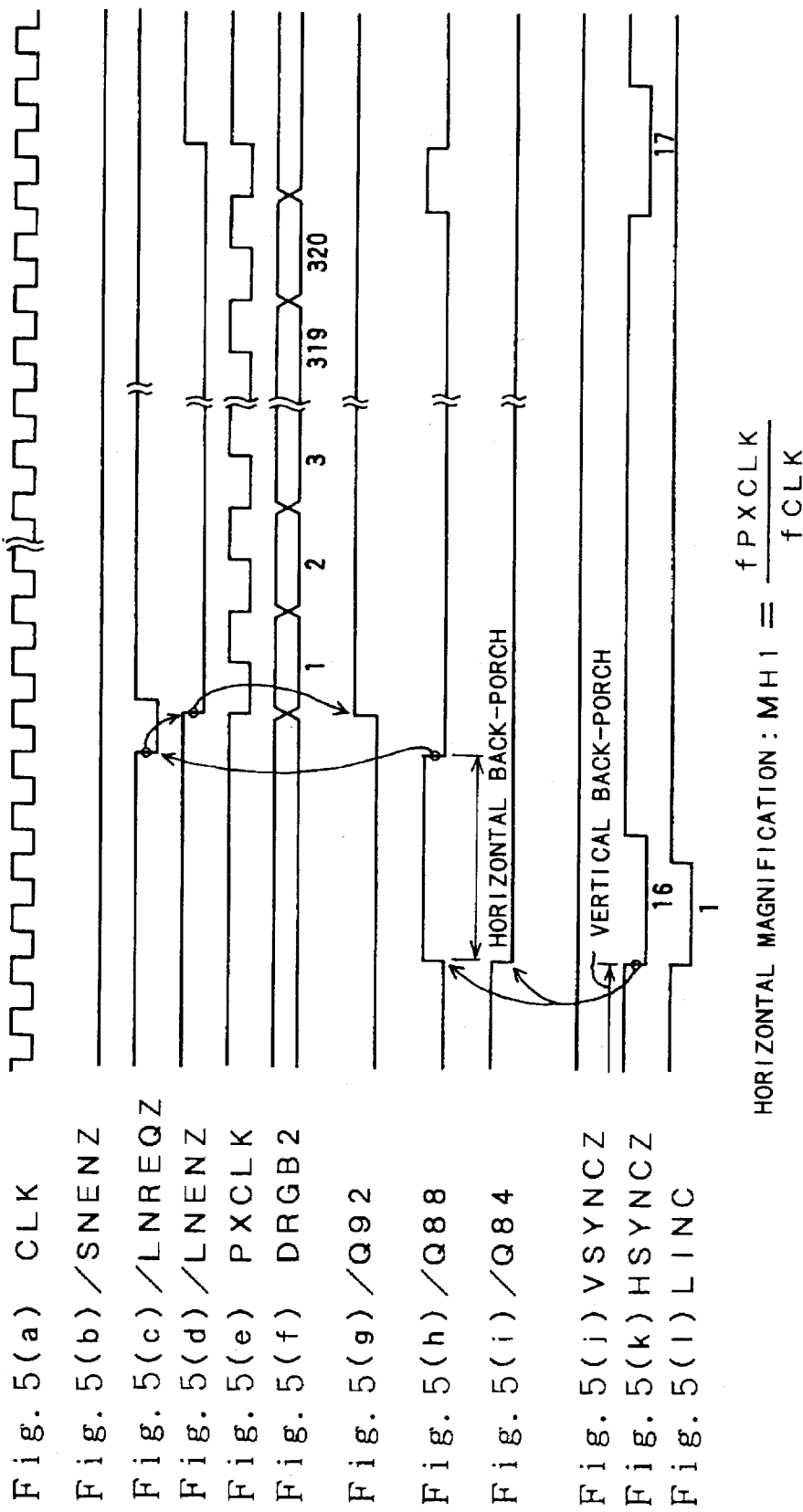
FIGS. 5(a) through 5(l) are timing charts showing details of part A in FIG. 4(l)

The two signals /Q92 (FIG. 5(g)) and /Q84 (FIG. 5(i)), which are input into the 3-input OR gate 89, are kept in logic low immediately after the vertical back-porch period. Accordingly, the line request signal /LNREQZ (FIG. 5(c)) output from the 3-input OR gate 89 falls to logic low in response to a fall of the output /Q88 of the horizontal back-porch counter 88 to logic low. The video compressing unit 64 receives the line request signal /LNREQZ at logic low to make the line enable signal /LNENZ fall to logic low (FIG. 5(d)), which indicates that the compressing operations are enabled. The two flip-flops 90 and 92 are reset in response to a fall of the line enable signal /LNENZ to logic low, and the inverted output /Q92 of the second flip-flop 92 accordingly rises to logic high.

The video compressing unit 64 compresses the second digital video signal DRGB2 (FIG. 5(f)) while the line enable signal /LNENZ is kept in logic low. The digital video signal DRGB2 has been obtained through analog-to-digital conversion in synchronism with the pixel clock PXCLK (FIG. 5(e)). In the example of FIG. 5(f), one scanning line includes 320 pixels. A horizontal magnification MH1 of the video image is equal to a ratio of a frequency $f_{PXCLK}$ of the pixel clock PXCLK to a frequency $f_{CLK}$ of the reference clock signal CLK as shown below FIG. 5(l). A video image can thus be expanded or reduced in the horizontal direction at a desirable magnification by changing a preset value in the PLL circuit 65 of the video compressing unit 64 shown in FIG. 3 and adjusting the frequency of the pixel clock PXCLK. After the compression of video signals for one scanning line is completed, the video compressing unit 64 makes the line enable signal /LNENZ rise to logic high.

Figure 6:
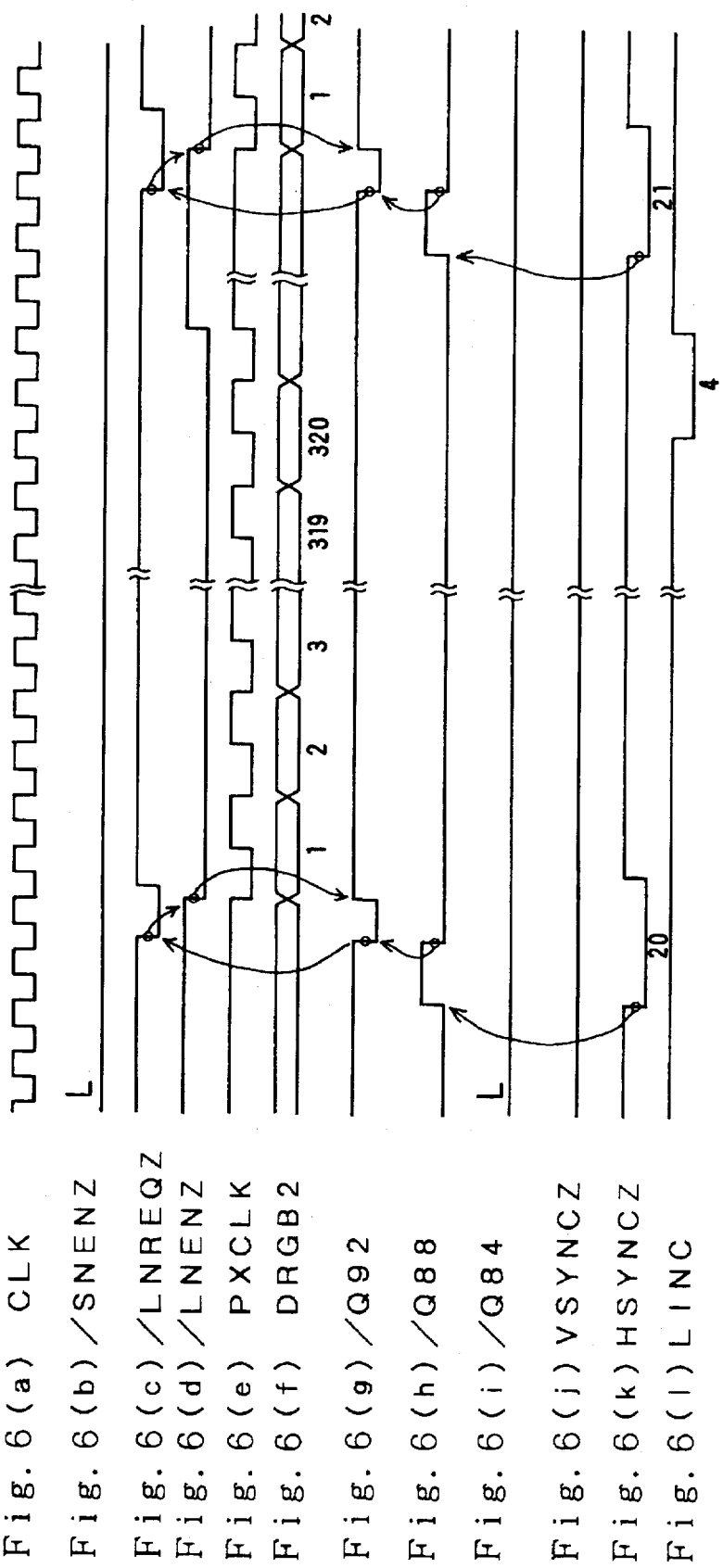
FIGS. 6(a) through 6(l) are timing charts showing details of part B in FIG. 4(l)

FIGS. 6(a) through 6(l) are timing charts showing details of part B shown in FIG. 4(l). As shown in FIG. 6(g), the inverted output /Q92 of the second flip-flop 92 is generally kept in logic high at a time point when one pulse of the horizontal synchronizing signal HSYNCZ is generated, in a period except the beginning of the effective video period, that is, except the part A shown in FIG. 4(l). Under such conditions, when the inverted output /Q92 of the second flip-flop 92 falls to logic low in response to a falling edge of the output /Q88 of the horizontal back-porch counter 88, the line request signal /LNREQZ falls to logic low. Other operations are similar to those shown in the timing chart of FIGS. 5(a)–5(l).

As shown by the arrows in FIGS. 4(a)–4(l), when both the inverted output /Q92 of the second flip-flop 92 and the output /Q88 of the horizontal back-porch counter 88 fall to logic low, the line request signal /LNREQZ also falls to logic low to start compression of video signals for one scanning line. As illustrated in the circuit diagram of FIG. 3, the inverted output /Q92 of the second flip-flop 92 falls to logic low only when the output /Q88 of the horizontal back-porch counter 88 falls to logic low after the line enable signal /LNENZ resets both the flip-flops 90 and 92 and one pulse of the line increment signal LINC makes the output of the flip-flop 90 logic high. In other words, one pulse of the line request signal /LNREQZ is created when one pulse of the horizontal synchronizing signal HSYNCZ is generated after one pulse of the line increment signal LINC.

Numerals shown below the waveforms of FIG. 4(k) represent ordinal pulse numbers of the horizontal synchronizing signal HSYNCZ after one pulse of the vertical synchronizing signal VSYNCZ occurs. As described above, compression of video data for one scanning line is executed in response to one pulse of the horizontal synchronizing signal HSYNCZ generated after one pulse of the line increment signal LINC. The video signals corresponding to the 16th, 18th, 20th, 21st, and 23rd pulses of the horizontal synchronizing signal HSYNCZ are subject to the data compression as shown in FIGS. 4(c) through 4(e). A video image thus captured consists of scanning lines corresponding to the 16th, 18th, 20th, 21st, and 23rd pulses of HSYNCZ, while scanning lines of 17th, 19th, 22nd pulses of HSYNCZ are skipped consequently. This results in size reduction of a video image in the vertical direction. A reduction rate $M_{V1}$ in the vertical direction is given as a ratio of a frequency $f_{LINC}$ of the line increment signal LINC to a frequency $f_{HSYNCZ}$ of the horizontal synchronizing signal HSYNCZ. A video image can thus be contracted in the vertical direction at a desirable reduction rate by adjusting a preset value in the reduction synchronizing signal generator 86 shown in FIG. 3.

The compressed video data thus obtained are transmitted from the video compressing unit 64 to the external storage device 38 to be stored therein. Various methods including JPEG (Joint Photographic coding Experts Group), MPEG (Moving Picture Experts Goup), and MPEG2 may be applicable for compression by the video compressing unit 64. Since these compression methods compress YUV signals (video signals in the luminance/color difference system), the video compressing unit 64 has a function of converting RGB signals to YUV signals. When JPEG is applied for compression of a moving picture, the compression is executed for each field or each frame of the moving picture. If the computer system receives YUV signals from an external device, the video compressing unit 64 does not need the function of converting RGB signals to YUV signals.

As described above, a captured video image can be expanded or contracted in the horizontal direction at a desirable magnification $M_{H1}$ by adjusting the preset value in the PLL circuit 65 and in the vertical direction at a desirable magnification $M_{V1}$ by adjusting the preset value in the reduction synchronizing signal generator 86. In capturing of a moving picture, the image is displayed on the color monitor 44 based on the first digital video signal DRGB1 output from the first A-D converter 52. Accordingly, a moving picture of desirable dimensions can be displayed irrespective of the size of the captured image (CAPH× CAPV) as shown in FIG. 2.

C. Image Expansion Process in Image Restoration

Figure 7:
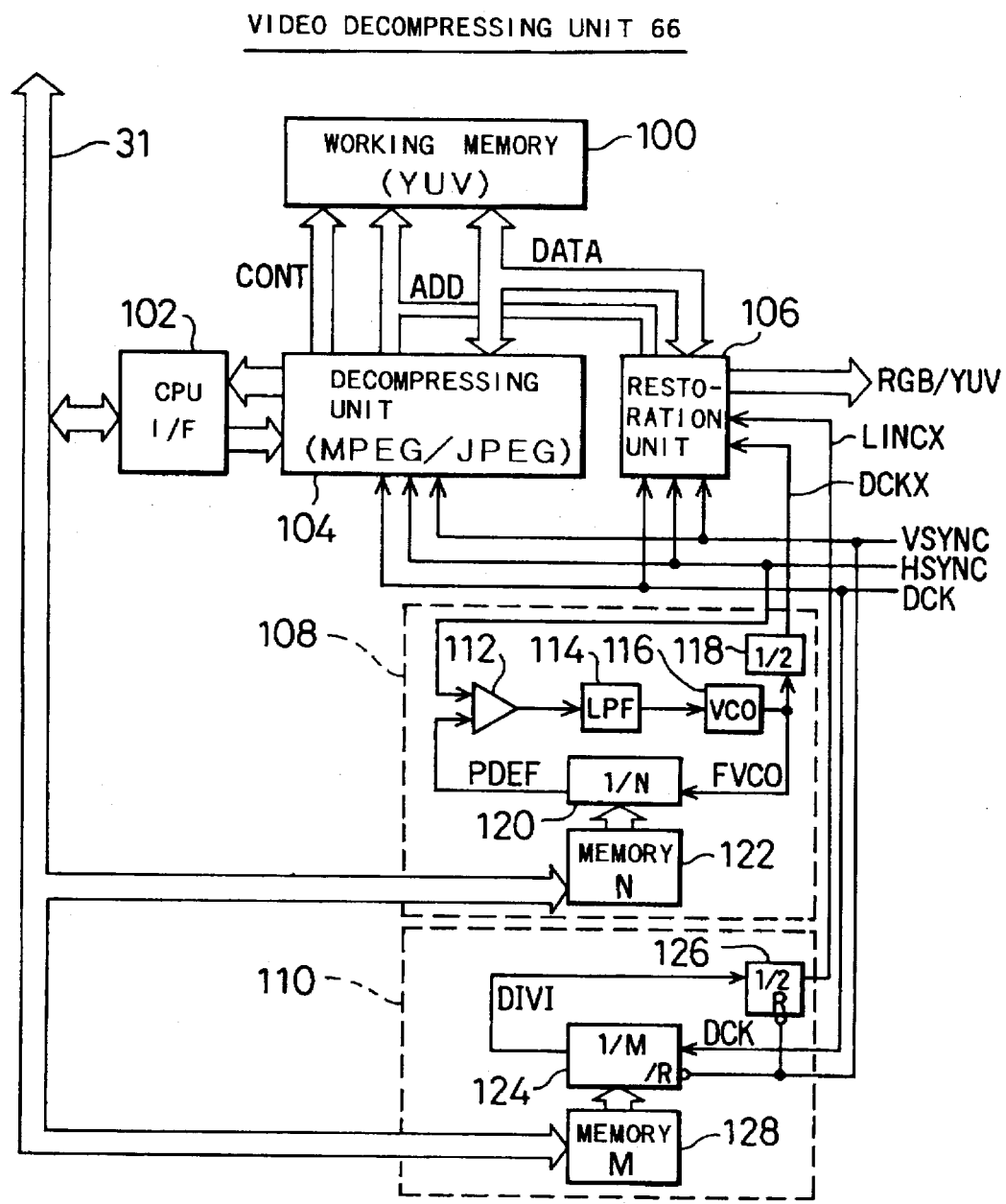
FIG. 7 is a block diagram illustrating the internal structure of a video decompressing unit 66.

FIG. 7 is a block diagram illustrating the internal structure of the video decompressing unit 66. The video decompressing unit 66 includes a working memory 100, a CPU interface 102, an decompressing unit 104, a restoration unit 106, a PLL circuit 108, and a counter unit 110.

The PLL circuit 108 controls expansion and contraction of a video image in the horizontal direction. The PLL circuit 108 comprises a comparator 112, a low-pass filter 114, a voltage-controlled oscillator (VCO) 116, a ½ frequency divider (or a divide-by-two counter) 118, a 1/N frequency divider (or a divide-by-N counter) 120, and a memory 122. The counter unit 110 for controlling decompression and compression of a video image in the vertical direction includes a 1/M frequency divider 124, a ½ frequency divider 126, and a memory 128.

The CPU interface 102 transfers data between the CPU 30 and the decompressing unit 104 via a CPU bus 31. The decompressing unit 104 decompresses given compressed video data and writes the decompressed video data (YUV data) in the working memory 100. The restoration unit 106 reads out the decompressed video data from the working memory 100 while converting YUV data to RGB data if required.

The decompressing unit 104 and the restoration unit 106 receive a vertical synchronizing signal VSYNC, a horizontal synchronizing signal HSYNC, and a dot clock signal DCK supplied from the synchronizing signal generator 68 (FIG. 1).

The comparator 112 of the PLL circuit 108 receives the horizontal synchronizing signal HSYNC and an output PDEF of the 1/N frequency divider 120. An output of the comparator 112 is given to the voltage-controlled oscillator 116 via the low-pass filter 114, while an output FVCO of the voltage-controlled oscillator 116 is divided by N in the 1/N frequency divider 120 and fed back to the comparator 112. The frequency of the output FVCO of the voltage-controlled oscillator 116 will become equal to N times the frequency of the horizontal synchronizing signal BSYNC. A frequency division factor N to be used in the 1/N frequency divider 120 is written in the memory 122 by the CPU 30.

Figure 8:
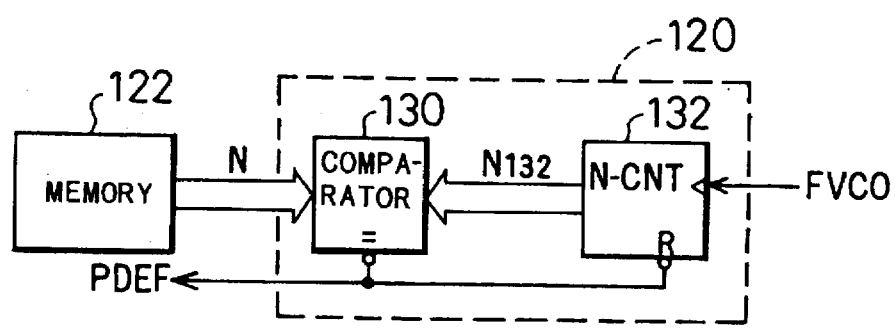
FIG. 8 is a block diagram showing the internal structure of a 1/N frequency divider 120.

FIG. 8 is a block diagram showing the internal structure of the 1/N frequency divider 120. The 1/N frequency divider 120 comprises a comparator 130 and a counter 132. The counter 132 counts the number of pulses of the output FVCO from the voltage-controlled oscillator 116. The comparator 130 compares a count N132 in the counter 132 with the preset value N stored in the memory 122, and makes the output PDEF fall to logic low when the count N132 becomes equal to the preset value N. The counter 132 is reset in response to a fall of the output PDEF of the comparator 130 and starts counting up the number of pulses of the signal FVCO over again. As a result, one pulse of the output signal PDEF of the 1/N frequency divider 120 is generated for every N pulses of the output signal FVCO of the voltage-controlled oscillator 116.

The output FVCO of the voltage-controlled oscillator 116 is divided by two in the ½ frequency divider 118 and supplied to the restoration unit 106 as a second dot clock signal DCKX. The second dot clock signal DCKX defines a timing of increasing a pixel position (or a horizontal address) of video data which is read out of the working memory 100 by the restoration unit 106.

The 1/M frequency divider 124 of the counter unit 110 divides the frequency of the first dot clock signal DCK output from the synchronizing signal generator 68 by M. An output DIVI of the 1/M frequency divider 124 is further divided by two in the ½ frequency divider 126. A frequency $f_{LINCX}$ of a line increment signal LINCX, which is output from the ½ frequency divider 126, is thus equal to 1/(2×M) times a frequency $f_{DCK}$ of the first dot clock signal DCK. The line increment signal LINCX defines a timing of increasing a scanning line position (or a vertical address) of vide data which is read out of the working memory 100 by the restoration unit 106.

Figure 9:
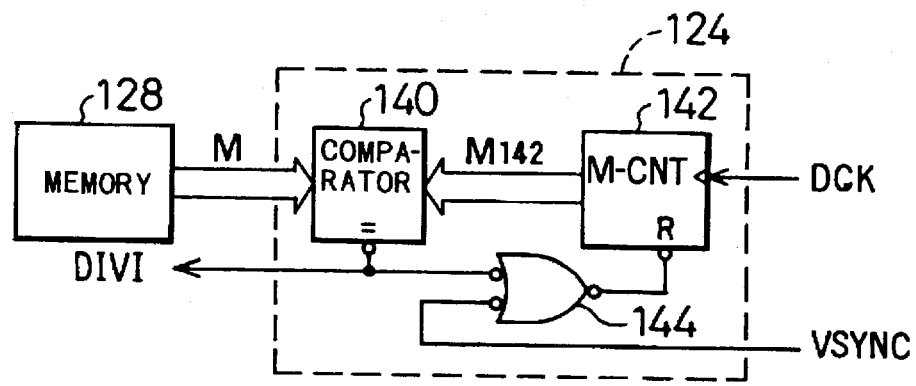
FIG. 9 is a block diagram illustrating the internal structure of a 1/M frequency divider 124.

FIG. 9 is a block diagram illustrating the internal structure of the 1/M frequency divider 124. The 1/M frequency divider 124 comprises a comparator 140, a counter 142, and an AND gate 144. The counter 142 counts the number of pulses of the first dot clock signal DCK. The comparator 140 compares a count M142 in the counter 142 with a preset frequency division factor M stored in the memory 128, and makes the output DIVI fall to logic low when the count M142 becomes equal to the preset value M. The AND gate 144 receives the output DIVI of the comparator 140 as well as the vertical synchronizing signal VSYNC and supplies an output to a reset terminal of the counter 142. The counter 142 is thus reset in response to every fall of the vertical synchronizing signal VSYNC and every fall of the output DIVI from the comparator 140, and starts counting up the number of pulses of the first dot clock signal DCK accordingly.

The restoration unit 106 (FIG. 7) creates a reading address based on: the synchronizing signals VSYNC and HSYNC and the first dot clock signal DCK output from the synchronizing signal generator 68; the second dot clock signal DCKX output from the PLL circuit 108; and the line increment signal LINCX output from the counter unit 110. The restoration unit 106 reads out video data from the working memory 100 based on the reading address.

Figure 10:
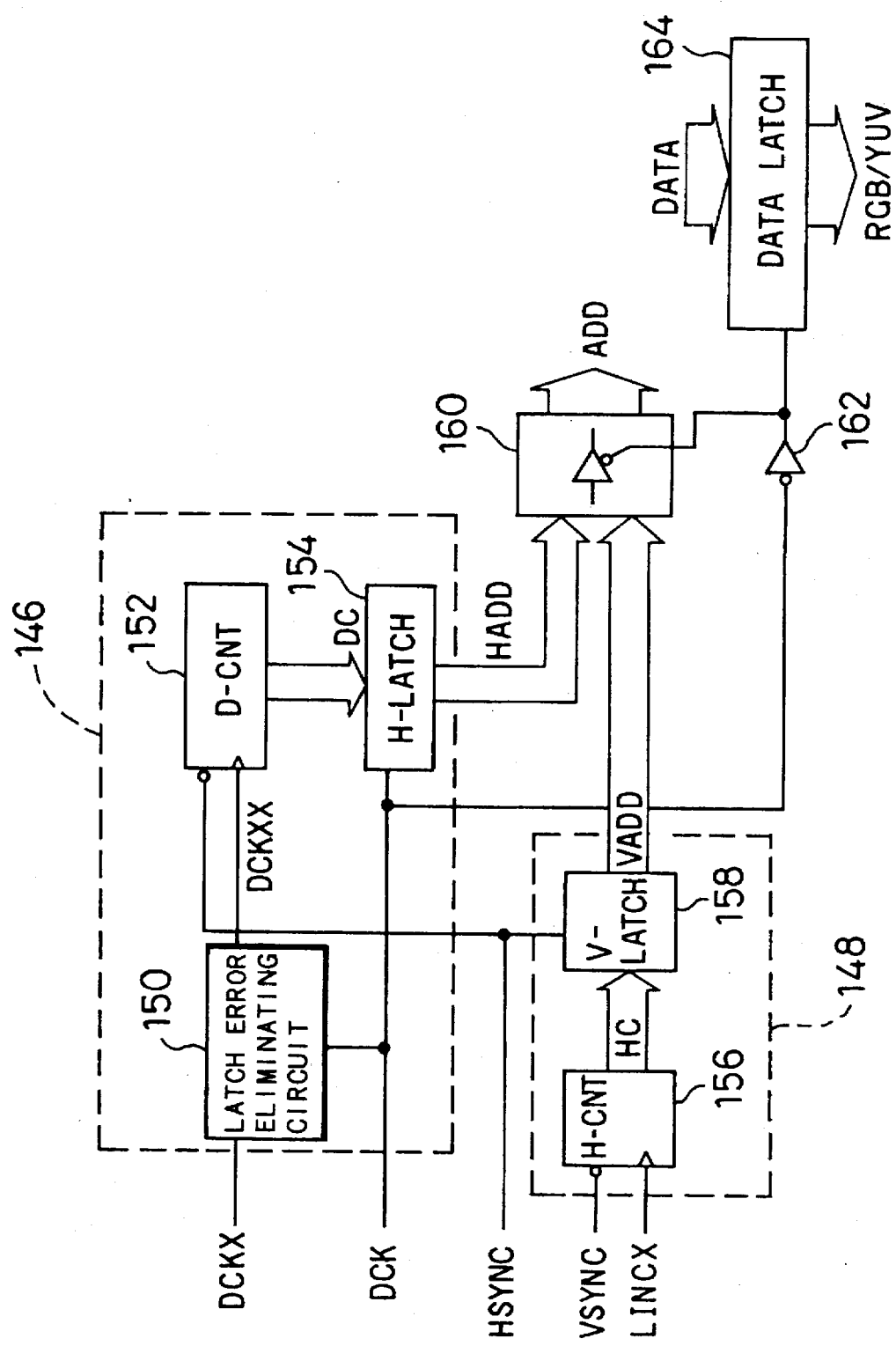
FIG. 10 is a block diagram illustrating the structure of an address generator unit in the restoration unit 106.

FIG. 10 is a block diagram illustrating the structure of an address generator unit in the restoration unit 106. The address generator unit includes a horizontal address generator 146, a vertical address generator 148, a 3-state buffer 160, an inverter 162, and a data latch 164. The horizontal address generator 146 includes a latch error eliminating circuit 150, a first counter 152, and a first latch 154, and the vertical address generator 148 includes a second counter 156 and a second latch 158.

Figure 11:
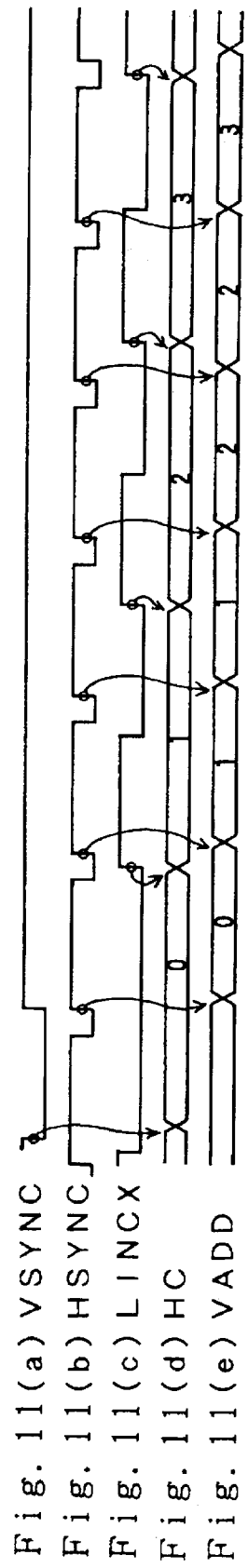
FIGS. 11(a) through 11(e) are timing charts showing operations of generating a vertical address.
Figure 12:
FIGS. 12(A) and 12(B) show an decompressing process of a video image in restoration.

FIGS. 11(a) through 11(e) are timing charts showing operations of the vertical address generator 148. The second counter 156 starts counting up the number of pulses of the line increment signal LINCX after reset by the vertical synchronizing signal VSYNC (FIG. 11(a)). A count HC (FIG. 11(d)) in the second counter 156 is latched at a rising edge of the horizontal synchronizing signal HSYNC and given to the 3-state buffer 160 as a vertical address VADD. In the example of FIG. 11(e), the vertical address VADD is updated as 0, 1, 1, 2, 2, 3, . . . . FIGS. 12(A) and 12(B) show an expansion process of a video image in restoration. FIG. 12(A) shows video data stored in the working memory 100, and FIG. 12(B) shows expanded video data. Numerals written in the respective boxes of the drawings represent values of video data. In the timing chart of FIG. 11(e), video data are read out of the working memory 100 such that a video image for a scanning line of VADD=0 is read out once, a video image for a scanning line VADD=1 is read out twice, and a video image for a scanning line of VADD=2 is read out twice. The restoration unit 106 thus reads out a video image expanded in the vertical direction as shown in FIG. 12(B). A magnification $M_{V2}$ in the vertical direction is defined as a ratio of a frequency $f_{HSYNC}$ of the horizontal synchronizing signal HSYNC to a frequency $f_{LINCX}$ of the line increment signal LINCX. In restoration of a moving picture, a video image can be expanded in the vertical direction at a desirable magnification by adjusting the preset value M stored in the memory 128 of the counter unit 110 (FIG. 7). The video image can be also compressed in the vertical direction by setting the magnification $M_{V2}$ to be less than one.

FIGS. 13(A) through 13(j) are timing charts showing operations of the horizontal address generator 146. The latch error eliminating circuit 150 (FIG. 10) generates a third clock signal DCKXX (FIG. 13(e)) from the first dot clock signal DCK (FIG. 13(b)) and the second dot clock signal DCKX (FIG. 13(d)).

Figure 13:
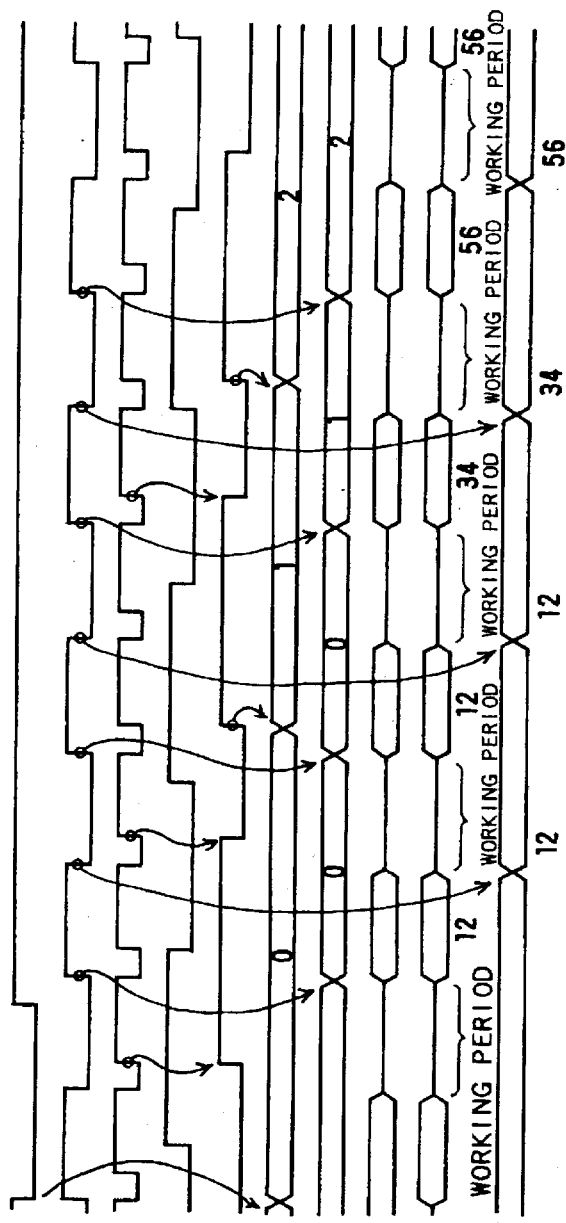
FIGS. 13(a) through 13(j) are timing charts showing operations of generating a horizontal address.
Figure 14:
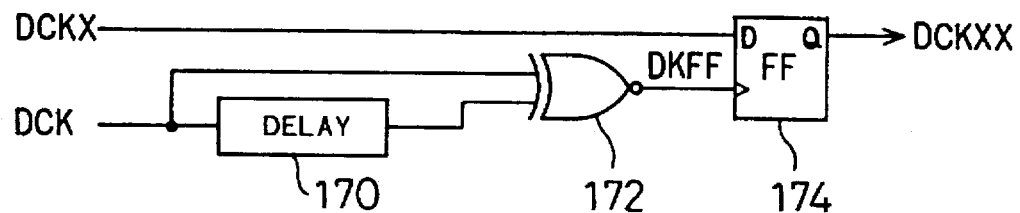
FIG. 14 is a block diagram illustrating the internal structure of a latch error eliminating circuit 150.

FIG. 14 is a block diagram illustrating the internal structure of the latch error eliminating circuit 150. The latch error eliminating circuit 150 includes a delay circuit 170, an EXNOR (EXclusive NOR) circuit 172, and a D type flip-flop 174. An output signal DKFF of the EXNOR circuit 172 is an inversion of exclusive OR of the first dot clock signal DCK and a signal obtained by delaying the dot clock signal DCK for a predetermined time period. The output signal DKFF accordingly shows a timing of rise and fall of the first dot clock signal DCK as shown in FIGS. 13(b) and 13(c).

The flip-flop 174 receives the output signal DKFF of the EXNOR circuit 172 at its clock input terminal and the second dot clock signal DCKX at its D-input terminal. The third dot clock signal DCKXX output from the flip-flop 174 thus shows a level of the second dot clock signal DCKX at a rising edge of the output signal DKFF of the EXNOR circuit 172 as shown in FIG. 13(e). The third dot clock signal DCKXX has a frequency identical with that of the second dot clock signal DCKX. Since the output signal DKFF of the EXNOR circuit 172 rises after a predetermined delay time from an edge of the first dot clock signal DCK, the level change of the third dot clock signal DCKXX also occurs with a predetermined delay after an edge of the first dot clock signal DCK. The latch error eliminating circuit 150 generates this third dot clock signal DCKXX in order to stabilize the value of a horizontal address latched by the first latch 154, as described later in detail.

The first counter 152 of the horizontal address generator 146 (FIG. 10) is reset in response to a pulse of the horizontal synchronizing signal HSYNC and starts counting up the number of pulses of the third dot clock signal DCKXX output from the latch error eliminating circuit 150. A count DC (FIG. 13(f)) in the first counter 152 is supplied to the first latch 154. Since the third dot clock signal DCKXX has a frequency identical with that of the second dot clock signal DCKX, the count DC in the first counter 152 substantially represents the number of pulses of the second dot clock signal DCKX. The first latch 154 holds the count DC in synchronism with the first dot clock signal DCK and supplies the latched count as a horizontal address HADD (FIG. 13(g)) to the 3-state buffer 160. The horizontal address HADD represents the number of pulses of the second dot clock signal DCKX and is updated according to each rising edge of the first dot clock signal DCK. The update mode of the horizontal address HADD can be changed by adjusting a frequency $f_{DCK}$ of the first dot clock signal DCK and a frequency $f_{DCKX}$ of the second dot clock signal DCKX. In the example of FIG. 13(g), the horizontal address HADD is updated as 0, 0, 1, 2, . . . .

FIGS. 12(A) and 12(B) stated before also illustrate horizontal expansion of video images according to the updated horizontal address HADD shown in FIG. 13(g). In the timing charts of FIGS. 13(a)–13(j), horizontal addresses are generated for an upper-most scanning line of the video data of FIG. 12(B) where the vertical address VADD is equal to zero. The horizontal address HADD is updated as 0, 0, 1, 2 . . . as shown in FIG. 13(g). Video data of the respective pixels on the upper-most scanning line are successively read out of the working memory 100 such that video data for the pixel of the horizontal address HADD=0 is read out twice and video data for the pixel of the horizontal address HADD=1 is read out once, and so on.

The update mode of the horizontal address HADD depends upon the relationship between the frequencies of the first and the second dot clock signals DCK and DCKX as described above. This means that a video image can be expanded or contracted in the horizontal direction by adjusting the frequencies of these dot clock signals DCK and DCKX. In restoration of a moving picture, a magnification $M_{H2}$ of a video image in the horizontal direction is given as a ratio of the frequency $f_{DCK}$ of the first dot clock signal DCK to the frequency $f_{DCKX}$ of the second dot clock signal DCKX. A restored video image can thus be expanded or contracted in the horizontal direction at a desirable magnification by adjusting the preset value N stored in the memory 122 of the PLL circuit 108 (FIG. 7).

The reason why the latch error eliminating circuit 150 generates the third dot clock signal DCKXX is as follows. The count DC in the first counter 152 (FIG. 10) increases in synchronism with a rising edge of the third dot clock signal DCKXX (FIG. 13(e)) after the horizontal synchronizing signal HSYNC (FIG. 13(a)) is restored to logic high. Each edge of the third dot clock signal DCKXX is delayed by a predetermined time behind an edge of the first dot clock signal DCK as described previously. This means that the latch timing of the first latch 154 does not overlap with the timing of value change of the count DC. This effectively stabilizes the value the horizontal address HADD accordingly.

As can be understood from FIG. 10, the 3-state buffer 160 transmits an address ADD (FIG. 13(h)) to the working memory 100 only when the first dot clock signal DCK is logic high. During a period when the first dot clock signal DCK is logic low, the decompressing unit 104 decompresses compressed video data. Since the data latch 164 holds video data when the first dot clock signal DCK falls to logic low, an output RGB/YUV (FIG. 13(j)) of the data latch 164 is accordingly updated at each falling edge of the first dot clock signal DCK.

As described above, in restoration of a compressed moving picture, a video image can be expanded or contracted in the horizontal direction at a desirable magnification $M_{H2}$ by adjusting the preset value N stored in the memory 122 of the PLL circuit 108 and in the vertical direction at a desirable magnification $M_{V2}$ by adjusting the preset value M stored in the memory 128 of the counter unit 110. A moving picture expanded or contracted by the desirable magnifications $M_{H2}$ and $M_{V2}$ is then displayed on the color monitor 44. Therefore, the user can enjoy an image of a desirable size on the screen, irrespective of the size of the captured moving picture.

Figure 15:
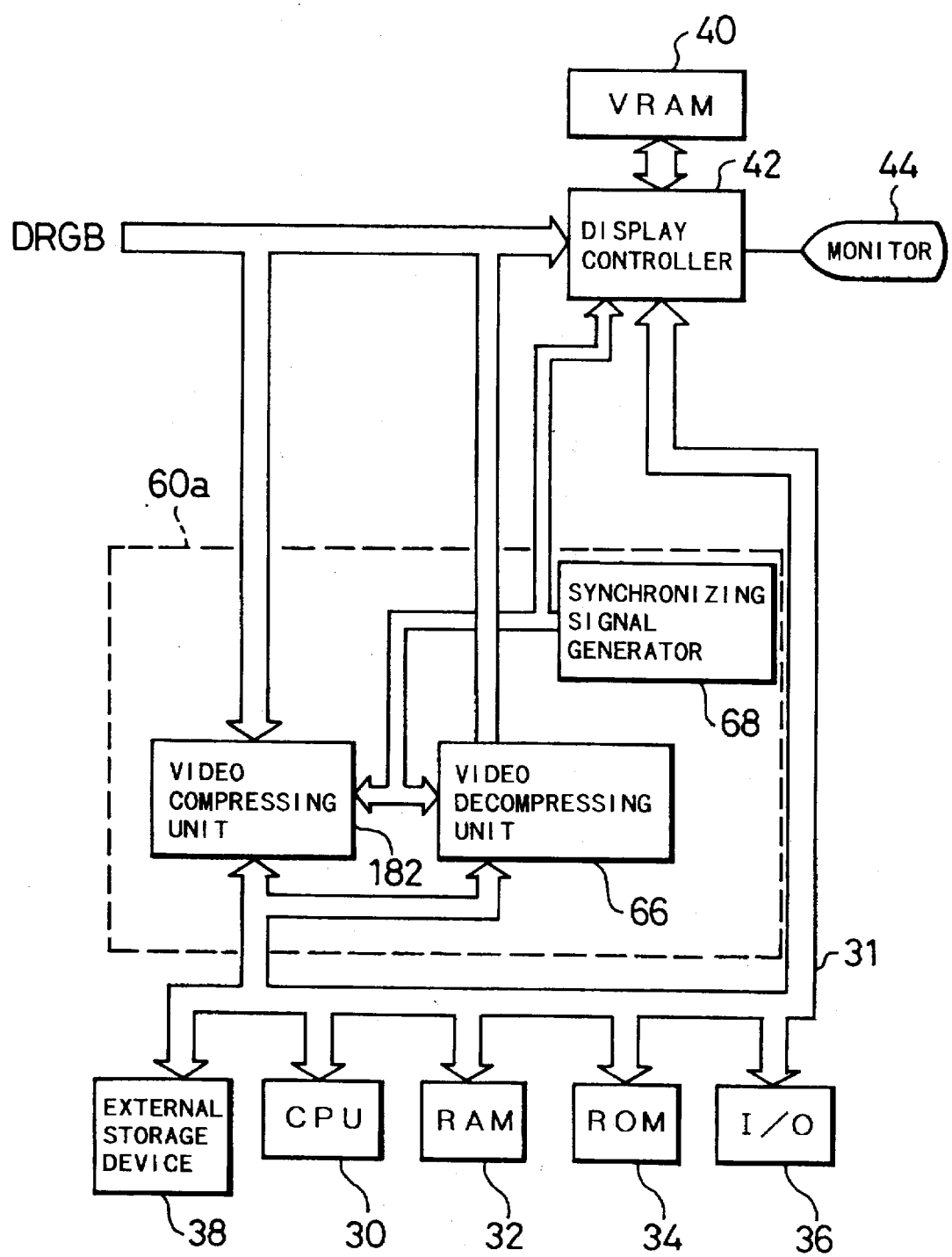
FIG. 15 is a block diagram showing the structure of another embodiment according to the invention.

FIG. 15 is a block diagram illustrating another computer system embodying the invention. The computer system shown in FIG. 15 is realized by omitting the video decoder 50, the two A-D converters 52 and 54, and the vertical reduction controller 62 from the computer system of FIG. 1 and replacing the video compressing unit 64 by another video compressing unit 182.

In the computer system of FIG. 15, a digital video signal DRGB transmitted from an external device is supplied commonly to the display controller 42 and the video compressing unit 182. The display controller 42 displays a video image on the color monitor 44 as a function of the digital video signal DRGB. The video compressing unit 182 has a function of reducing a size of a video image represented by the digital video signal DRGB both in the horizontal direction and the vertical direction, and compressing the digital video signal representing the reduced video image.

Figure 16:
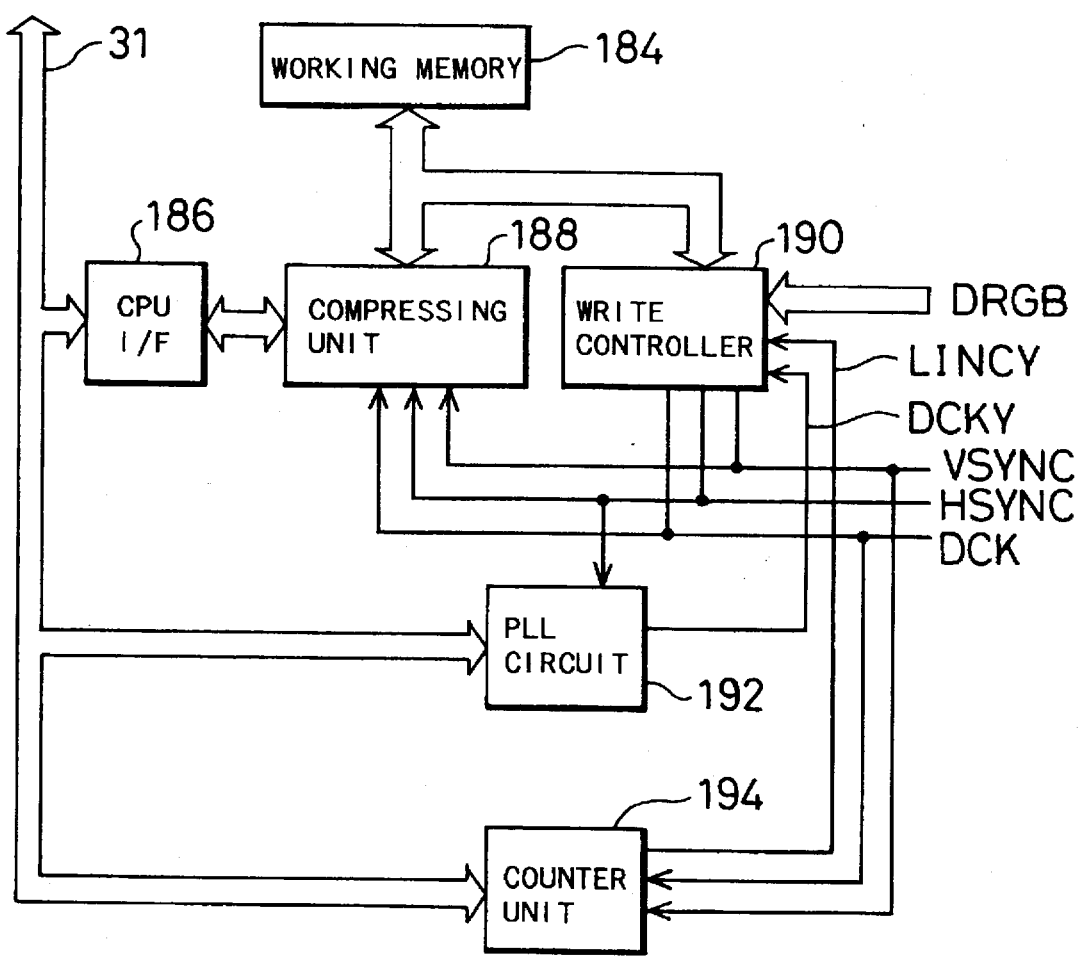
FIG. 16 is a block diagram illustrating the internal structure of a video compressing unit 182.

FIG. 16 is a block diagram showing the internal structure of the video compressing unit 182. The video compressing unit 182 includes a working memory 184, a CPU interface 186, a compressing unit 188, a write controller 190, a PLL circuit 192, and a counter unit 194. The video compressing unit 182 of FIG. 16 has a structure similar to the video decompressing unit 66 shown in FIG. 7 but has a reverse function from the unit 66. The video compressing unit 182 has a function of reducing a video image and compressing a video signal representing the reduced video image, while the video decompressing unit 66 has a function of decompressing compressed video data and enlarging a video image represented by the expanded video signal.

The write controller 190 converts the given digital video signal DRGB to a YUV signal and writes the YUV signal into the working memory 184. The write controller 190 contracts a video image in the vertical direction in response to a line increment signal LINCY output from the PLL circuit 192 and in the horizontal direction in response to a dot clock signal DCKY output from the counter unit 194. The PLL circuit 192 and the counter unit 194 have the same structure as those of the PLL circuit 108 and the counter unit 110 shown in FIG. 7, respectively.

The compressing unit 188 compresses the YUV signal stored in the working memory 184 to generate compressed video data, which are subsequently stored in the external storage device 38 via the CPU interface 186 and the CPU bus 31.

The computer system shown in FIGS. 15 and 16 can compress a video signal representing a video image at a desirable magnification while displaying the video image in its original size. The computer system can also restore a video image to display the same in a desirable size irrespective of the size of the image represented by the compressed video data.

Incidentally, various display devices including a CRT and a liquid-crystal display can be applicable for the color monitor 44.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for compressing a video signal, said apparatus comprising:

a display device for displaying a video image;

a frame memory for storing a video signal to be supplied to said display device;

receiving means for receiving a video signal representing an image;

a video controller for writing said video signal supplied from said receiving means into said frame memory and reading out said video signal from said frame memory to display said image on said display device as a function of said video signal;

reducing-compressing means for processing said video signal supplied from said receiving means to reduce a size of said image and compressing a video signal representing the reduced image to generate a compressed video signal said processing and said compressing being executed without storing said video signal into said frame memory; and a memory for storing said compressed video signal.

2. An apparatus in accordance with claim 1, further comprising:
   a first A-D converter, coupled between said receiving means and said video controller, for executing analog-to-digital conversion on said video signal in synchronism with a first clock signal to thereby produce a first digital video signal and transmitting the first digital video signal to said video controller; and
   a second A-D converter, coupled between said receiving means and said reducing-compressing means, for executing analog-to-digital conversion on said video signal in synchronism with a second clock signal to thereby produce a second digital video signal and transmitting the second digital video signal to said reducing-compressing means;
   wherein said reducing-compressing means comprises:
      horizontal reducing means for supplying said second clock signal to said second A-D converter and adjusting a frequency of said second clock signal to reduce an image represented by said second digital video signal in a horizontal direction;
      compressing means for compressing said second digital video signal; and
      vertical reducing means for supplying a scanning line timing signal to said compressing means, said scanning line timing signal indicating a timing of updating a vertical address of the second digital video signal, and adjusting a frequency of said scanning line timing signal to reduce said image in the vertical direction.

3. An apparatus for decompressing a compressed video signal, said apparatus comprising:
   a displays device for displaying a video image;
   a frame memory for storing a video signal to be supplied to said display device;
   a memory for storing a compressed video signal;
   decompressing-enlarging means for decompressing said compressed video signal stored in said memory to generate a restored video signal, and processing said restored video signal to enlarge a size of an image represented by said restored video signal said decompressing and said processing being executed before supplying said restored video signal or said frame memory; and
   a video controller for writing said restored video signal supplied from said decompressing-enlarging means into said frame memory and reading out said restored video signal from said frame memory to display said image on said display device as a function of said restored video signal.

4. An apparatus in accordance with claim 3, wherein said decompressing-enlarging means comprises:
   decompressing means for decompressing said compressed video signal to generate said restored video signal;
   a working memory for storing the restored video signal;
   vertical address generating means for generating a vertical address representing a scanning line position, said vertical address being supplied to said working memory in reading of the restored video signal from said working memory;
   horizontal address generating means for generating a horizontal address representing a pixel position on each scanning line, said horizontal address being supplied to said working memory in reading of the restored video signal from said working memory;
   vertical enlarging means for supplying a line increment signal to said vertical address generating means, said line increment signal indicating a timing of updating said vertical address, and adjusting a frequency of said line increment signal to enlarge said image in the horizontal direction; and
   horizontal enlarging means for supplying a dot clock signal to said horizontal address generating means, said dot clock signal indicating a timing of updating said horizontal address, and adjusting a frequency of said dot clock signal to enlarge said image in the horizontal direction.

5. An apparatus for compressing a video signal and decompressing a compressed video signal, said apparatus comprising:
   a display device for displaying a video image;
   a frame memory for storing a video signal to be supplied to said display device;
   a video controller for writing a given video signal into said frame memory and reading out a video signal from said frame memory to display a video image on said display device as a function of the read-out video signal;
   receiving means for receiving a video signal representing an image and supplying said video signal to said video controller, to thereby display said image on said display device as a function of said video signal;
   reducing-compressing means for processing said video signal supplied from said receiving means to reduce a size of said image and compressing a video signal representing the reduced image to generate a compressed video signal said processing and said compressing being executed without storing said video signal into said frame memory;
   a memory for storing said compressed video signal; and
   decompressing-enlarging means for decompressing said compressed video signal stored in said memory to generate a restored video signal, processing said restored video signal to enlarge a size of an image represented by said restored video signal, and supplying said restored video signal representing the enlarged image to said video controller, to thereby display said enlarged image on said display device as a function of said restored video signal.

6. An apparatus in accordance with claim 5, further comprising:
   a first A-D converter, coupled between said receiving means and said video controller, for executing analog-to-digital conversion on said video signal in synchronism with a first clock signal to thereby produce a first digital video signal and transmitting the first digital video signal to said video controller; and
   a second A-D converter, coupled between said receiving means and said reducing-compressing means, for executing analog-to-digital conversion on said video signal in synchronism with a second clock signal to thereby produce a second digital video signal and transmitting the second digital video signal to said reducing-compressing means;
   wherein said reducing-compressing means comprises:
      horizontal reducing means for supplying said second clock signal to said second A-D converter and adjusting a frequency of said second clock signal to reduce an image represented by said second digital video signal in a horizon direction;

compressing means for compressing said second digital video signal; and vertical reducing means for supplying a scanning line timing signal to said compressing means, said scanning line timing signal indicating a timing of updating a vertical address of the second digital video signal, and adjusting a frequency of said scanning line timing signal to reduce said image in the vertical direction.

7. An apparatus in accordance with claim 5, wherein said decompressing-enlarging means comprises:

decompressing means for decompressing said compressed video signal to generate said restored video signal;

a working memory for storing the restored video signal;

vertical address generating means for generating a vertical address representing a scanning line position, said vertical address being supplied to said working memory in reading of the restored video signal from said working memory;

horizontal address generating means for generating a horizontal address representing a pixel position on each scanning line, said horizontal address being supplied to said working memory in reading of the restored video signal from said working memory;

vertical enlarging means for supplying a line increment signal to said vertical address generating means, said line increment signal indicating a timing of updating said vertical address, and adjusting a frequency of said line increment signal to enlarge said image in the vertical direction; and horizontal enlarging means for supplying a dot clock signal to said horizontal address generating means, said dot clock signal indicating a timing of updating said horizontal address, and adjusting a frequency of said dot clock signal to enlarge said image in the horizontal direction.

8. A computer system for compressing a video signal, the computer system comprising:

microprocessor;

a processor bus coupled to said microprocessor;

a display device for displaying a video image;

a frame memory for storing a video signal to be supplied to said display device;

receiving means for receiving a video signal representing an image;

a video controller, coupled to said processor bus, said frame memory, and said display device, for writing said video signal supplied from said receiving means into said frame memory and reading out said video signal from said frame memory to display said image on said display device as a function of said video signal;

reducing-compressing means, coupled to said processor bus, for processing said video signal supplied from said receiving means to reduce a size of said image and compressing a video signal representing the reduced image to generate a compressed video signal said processing and said compressing being executed without storing said video into said frame; and a memory for storing said compressed video signal.

9. A computer system in accordance with claim 8, further comprising:

a first A-D converter, coupled between said receiving means and said video controller, for executing analog-to-digital conversion on said video signal in synchronism with a first clock signal to thereby produce a first digital video signal and transmitting the first digital video signal to said video controller; and a second A-D converter, coupled between said receiving means and said reducing-compressing means, for executing analog-to-digital conversion on said video signal in synchronism with a second clock signal to thereby produce a second digital video signal and transmitting the second digital video signal to said reducing-compressing means;

wherein said reducing-compressing means comprises:

horizontal reducing means for supplying said second clock signal to said second A-D converter and adjusting a frequency of said second clock signal to reduce an image represented by said second digital video signal in a horizontal direction;

compressing means for compressing said second digital video signal; and vertical reducing means for supplying a scanning line timing signal to said compressing means, said scanning line timing signal indicating a timing of updating a vertical address of the second digital video signal, and adjusting a frequency of said scanning line timing signal to reduce said image in the vertical direction.

10. A computer system for decompressing a compressed video signal, the computer system comprising:

a microprocessor;

a processor bus coupled to said microprocessor;

a display device for displaying a video image;

a frame memory for storing a video signal to be supplied to said display device;

a memory, coupled to said processor bus, for storing a compressed video signal;

decompressing-enlarging means, coupled to said processor bus, for decompressing said compressed video signal stored in said memory to generate a restored video signal, and processing said restored video signal to enlarge a size of an image represented by said restored video signal, said decompressing and said processing being executed before supplying said restored video signal to said frame memory; and a video controller, coupled to said processor bus and said frame memory, for writing said restored video signal supplied from said decompressing-enlarging means into said frame memory and reading out said video signal from said frame memory to display said image on said display device as a function of said video signal.

11. A computer system in accordance with claim 10, wherein said decompressing-enlarging means comprises:

decompressing means for decompressing said compressed video signal to generate said restored video signal;

a working memory for storing the restored video signal;

vertical address generating means for generating a vertical address representing a scanning line position, said vertical address being supplied to said working memory in reading of the restored video signal from said working memory;

horizontal address generating means for generating a horizontal address representing a pixel position on each scanning line, said horizontal address being supplied to said working memory in reading of the restored video signal from said working memory;

vertical enlarging means for supplying a line increment signal to said vertical address generating means, said line increment signal indicating a timing of updating said vertical address, and adjusting a frequency of said line increment signal to enlarge said image in the vertical direction; and horizontal enlarging means for supplying a dot clock signal to said horizontal address generating means, said dot clock signal indicating a timing of updating said horizontal address, and adjusting a frequency of said dot clock signal to enlarge said image in the horizontal direction.

12. A computer system for compressing a video signal and decompressing a compressed video signal, said computer system comprising:

a microprocessor;

a processor bus coupled to said microprocessor a display device for displaying a video image;

a frame memory for storing a video signal to be supplied to said display device;

a video controller, coupled to said processor bus, said display device, and said frame memory, for writing a given video signal into said frame memory and reading out a video signal from said frame memory to display a video image on said display device as a function of the read-out video signal;

receiving means for receiving a video signal representing an image and supplying said video signal to said video controller, to thereby display said image on said display device as a function of said video signal;

reducing-compressing means, coupled to said processor bus, for processing said video signal supplied from said receiving means to reduce a size of said image and compressing a video signal representing the reduced image to generate a compressed video signal, said processing and said compressing being executed without storing said video signal into said frame memory;

a memory, coupled to said processor bus, for storing said compressed video signal; and decompressing-enlarging means, coupled to said processor bus, for decompressing said compressed video signal stored in said memory to generate a restored video signal, processing said restored video signal to enlarge a size of an image represented by said restored video signal, and supplying said restored video signal representing the enlarged image to said video controller, to thereby display said enlarged image on said display device as a function of said restored video signal.

13. A computer system in accordance with claim 12, further comprising:

a first A-D converter, coupled between said receiving means and said video controller, for executing analog-to-digital conversion on said video signal in synchronism with a first clock signal to thereby produce a first digital video signal and transmitting the first digital video signal to said video controller; and a second A-D converter, coupled between said receiving means and said reducing-compressing means, for executing analog-to-digital conversion on said video signal in synchronism with a second clock signal to thereby produce a second digital video signal and transmitting the second digital video signal to said reducing-compressing means;

wherein said reducing-compressing means comprises:

horizontal reducing means for supplying said second clock signal to said second A-D converter and adjusting a frequency of said second clock signal to reduce an image represented by said second digital video signal in a horizontal direction;

compressing means for compressing said second digital video signal; and vertical reducing means for supplying a scanning line timing signal to said compressing means, said scanning line timing signal indicating a timing of updating a vertical address of the second digital video signal, and adjusting a frequency of said scanning line timing signal to reduce said image in the vertical direction.

14. A computer system in accordance with claim 12, wherein said decompressing-enlarging means comprises:

decompressing means for decompressing said compressed video signal to generate said restored video signal;

a working memory for storing the restored video signal;

vertical address generating means for generating a vertical address representing a scanning line position, said vertical address being supplied to said working memory in reading of the restored video signal from said working memory;

horizontal address generating means for generating a horizontal address representing a pixel position on each scanning line, said horizontal address being supplied to said working memory in reading of the restored video signal from said working memory;

vertical enlarging means for supplying a line increment signal to said vertical address generating means, said line increment signal indicating a timing of updating said vertical address, and adjusting a frequency of said line increment signal to enlarge said image in the vertical direction; and horizontal enlarging means for supplying a dot clock signal to said horizontal address generating means, said dot clock signal indicating a timing of updating said horizontal address, and adjusting a frequency of said dot clock signal to enlarge said image in the horizontal direction.

* * * * *